United States Patent [19]
Hikage et al.

[11] Patent Number: 6,059,243
[45] Date of Patent: May 9, 2000

[54] VESSEL HOLDER FOR AUTOMOBILE-MOUNTED CONSOLE BOX

[75] Inventors: Mitsuharu Hikage, Oizumi-machi; Tomoaki Satou, Utsunomiya, both of Japan

[73] Assignees: Nifco Inc., Kanagawa; Fuji Heavy Industries Ltd., Tokyo, both of Japan

[21] Appl. No.: 09/020,541

[22] Filed: Feb. 9, 1998

[30] Foreign Application Priority Data

Feb. 12, 1997 [JP] Japan ..................................... 9-027948

[51] Int. Cl.⁷ ...................................................... A47K 1/08
[52] U.S. Cl. ...................................................... 248/311.2
[58] Field of Search .................... 248/311.2; 297/188.14, 297/188.15, 188.16, 188.17; 296/37.8; 224/281, 282, 400; 220/521, 523, 526, 345.3, 345.4

[56] References Cited

U.S. PATENT DOCUMENTS

| | | | |
|---|---|---|---|
| 2,273,999 | 2/1942 | Rueger | 220/345.3 |
| 2,276,635 | 3/1942 | Weber | 220/345.5 |
| 4,738,423 | 4/1988 | DiFilippo et al. | 248/311.2 |
| 4,757,913 | 7/1988 | Yerman | 220/345.3 |
| 4,848,627 | 7/1989 | Maeda et al. | 224/275 |
| 5,400,914 | 3/1995 | Lin | 220/345.4 |
| 5,415,315 | 5/1995 | Ramirez | 220/345.3 |
| 5,458,256 | 10/1995 | Opheim | 220/345.3 |
| 5,725,122 | 3/1998 | Murphy et al. | 220/521 |

FOREIGN PATENT DOCUMENTS

61-76735 5/1986 Japan.
1-26522 8/1989 Japan.

*Primary Examiner*—Derek J. Berger
*Assistant Examiner*—David Heisey
*Attorney, Agent, or Firm*—Arent Fox Kintner Plotkin & Kahn LLP

[57] ABSTRACT

In the vessel holder for an automobile-mounted console box, the wobble of a vessel ie: cup or the like caused by the vibration and the like of an automobile is particularly prevented. A console box 10 includes a box main body 20 and a lid 40. The box main body 20 has a hollow structure with its upper surface opened and the rid is openably and closably attached to the open upper surface of the box main body 20. The lid 40 includes a cup inserting hole 70 and a sliding door 90. The cup inserting hole 70 passes through the lid 40 in a vertical direction. The sliding door 90 is slidably held by sliding rails 80 disposed to the lid 40 and opens and closes the cup inserting hole 70. The sliding door 90 is slid so as to be abutted against the periphery of cups A B C inserted into the cup inserting hole 70 and holds them between it and the inner edge of the cup inserting hole 70 by adjusting the amount of opening of the cup inserting hole 70.

9 Claims, 13 Drawing Sheets

VESSEL HOLDER FOR AUTOMOBILE-MOUNTED CONSOLE BOX

1. BACKGROUND OF THE INVENTION AND DESCRIPTION OF THE RELATED ART

The present invention relates to a vessel holder for an automobile-mounted console box, and more specifically, to a vessel holder for preventing the wobble of a vessel ie:cup or the like caused by the vibration and the like of an automobile.

Conventionally, this type of a vessel holder is provided with, for example, a cup inserting hole which vertically passes through the lid of a console box so that a cup can be inserted thereinto.

The cup is inserted from the cup inserting hole and the bottom of the cup is placed on the bottom of the hollow interior of the console box.

However, since the cup inserting hole is opened in the structure of the conventional cup holder, the cup holder has a first problem that it looks unattractive and there is a possibility that dust and the like may invade into the hollow interior of the console box.

When the inside diameter of the cup inserting hole is different from the outside diameter of the cup, there is also caused a problem.

That is, when the inside diameter of the cup inserting hole is larger than the outside diameter of the cup, a second problem arises in that there is a possibility that the cup wobbles in the cup inserting hole.

On the contrary, when the inside diameter of the cup is smaller than the outside diameter of the cup, a third problem arises in that the cup or the like cannot be inserted, from which inconvenience results.

A further problem may be caused by the depth of the hollow interior of the console box.

That is, when the bottom of the hollow interior of the console box is deep and the inside diameter of the cup inserting hole is larger than the outside diameter of the console box, there arises a fourth problem that the cup drops into the hollow interior of the console box and falls down or is difficult to be taken out.

At present, there is a tendency in a console box used in a one box type automobile that the bottom of the hollow interior thereof is deepened to increase the accommodating capacity thereof.

2. OBJECT AND SUMMARY OF THE INVENTION

Objects of the present invention made in view of the first to fourth problems of the prior art reside in the following points.

An object of the present invention is to open and close a vessel inserting hole by a sliding door.

Another object of the present invention is to permit a vessel having a different diameter to be held without wobble by the adjustment of the sliding amount of the sliding door.

Still another object of the present invention is to permit a vessel having a different height to be held by the provision of a folding type vessel receiver, in addition to the above objects.

A further object of the present invention is to easily position the sliding door by stopping it at a position on its way with a click feeling.

A still further object of the present invention is to easily position the sliding door at a closed position by stopping it there with a click feeling.

A yet still further object of the present invention is to reduce a space for accommodating the sliding door by composing it of a plurality of sliding sheets.

The respective inventions described in claims are made to achieve the above objects and the features of the respective inventions will be described with reference to the embodiments of the inventions shown in drawings.

Figure 1:
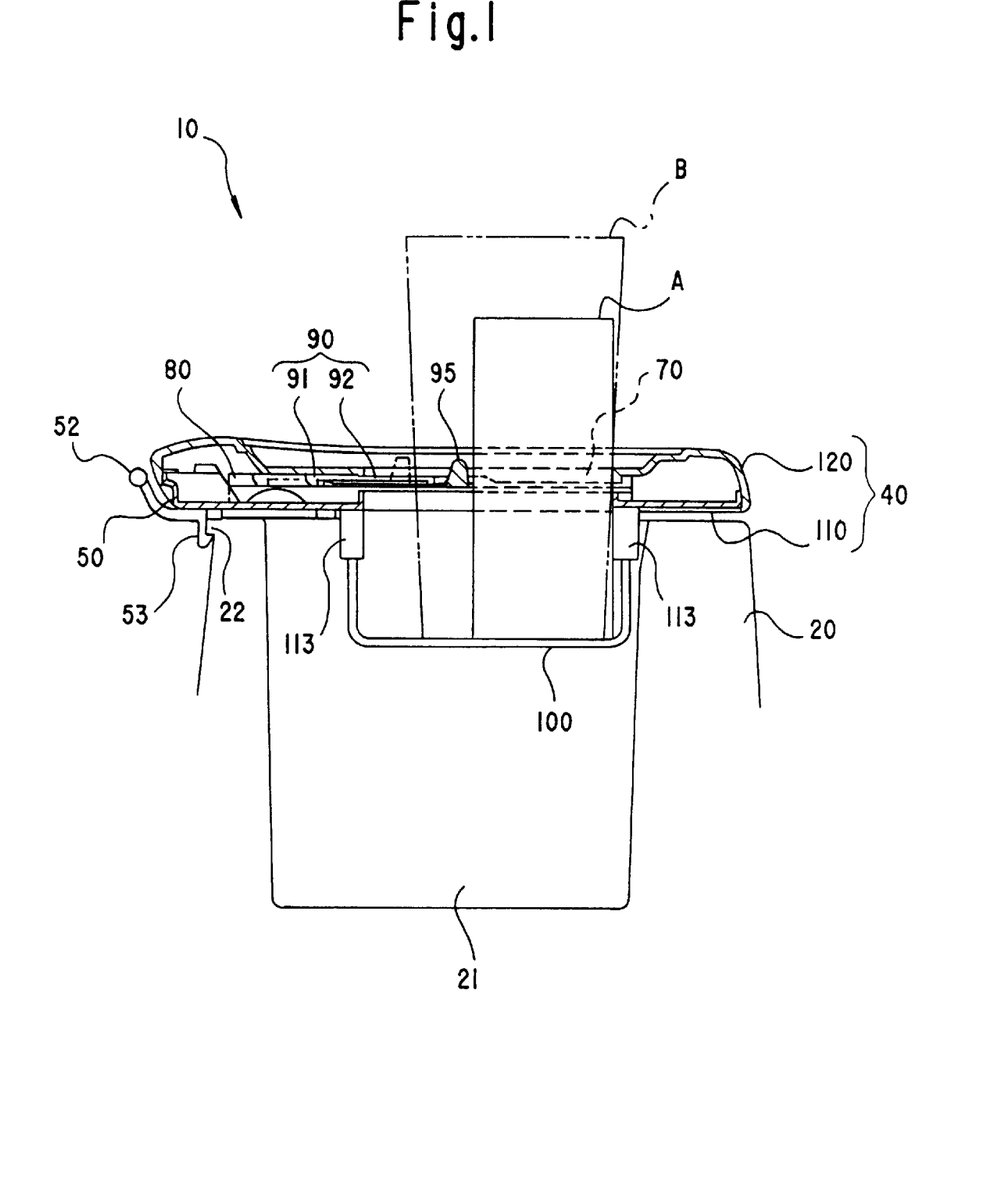
FIG. 1 is a side elevational view, partly in cross section, of a console box.
Figure 2:
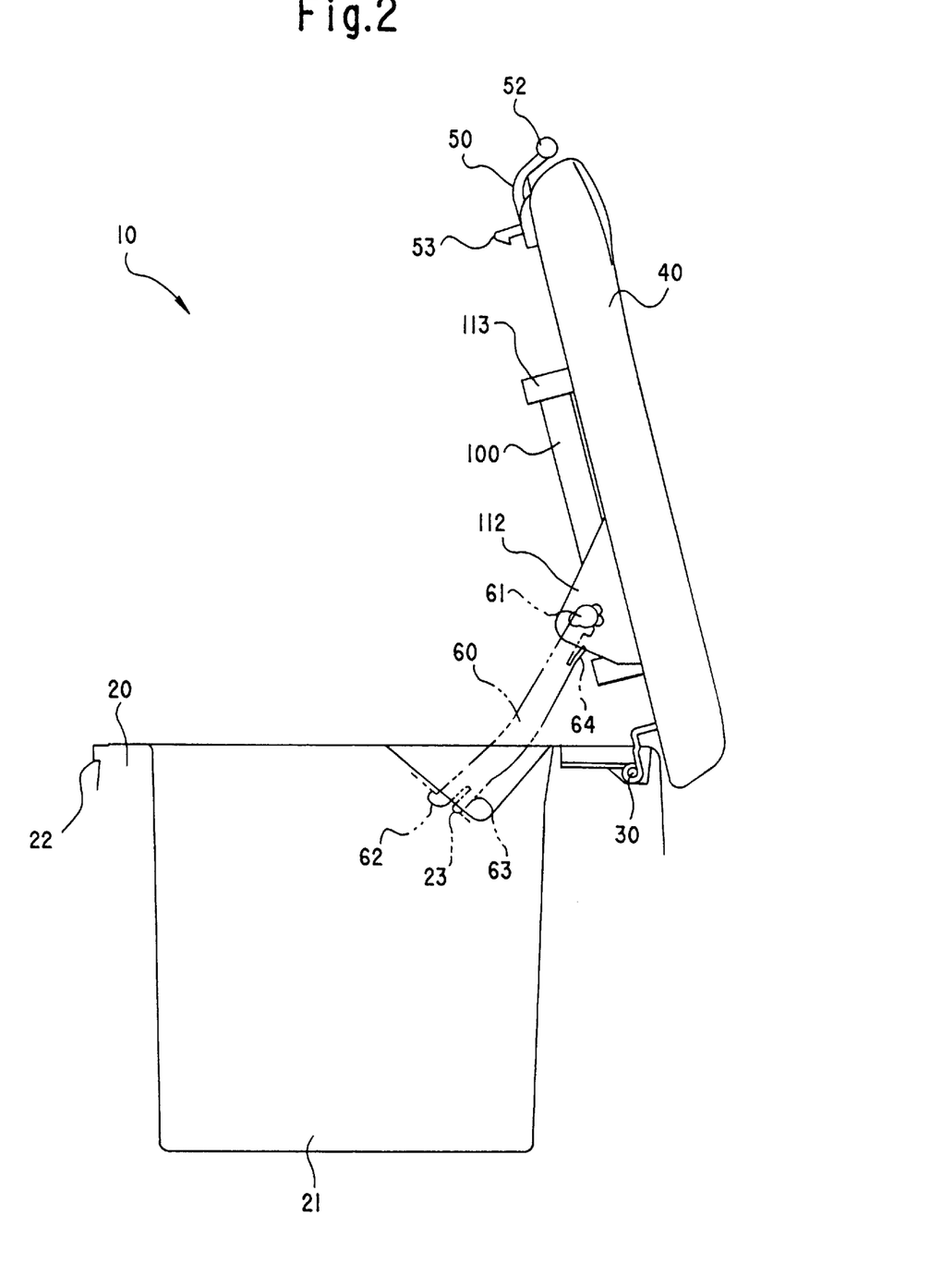
FIG. 2 is a side elevational view showing a state that a lid is opened.

In the present invention, an automobile-mounted console box (10) comprises a box main body (20) and a lid (40) as shown in, for example, FIGS. 1 and 2.

The box main body (20) has a hollow structure with its upper surface opened as shown in, for example, in FIGS. 1 and 2.

The lid (40) is attached to the open upper surface of the box main body (20) so as to be freely opened and closed as shown in, for example, FIGS. 1 and 2.

Figure 3:
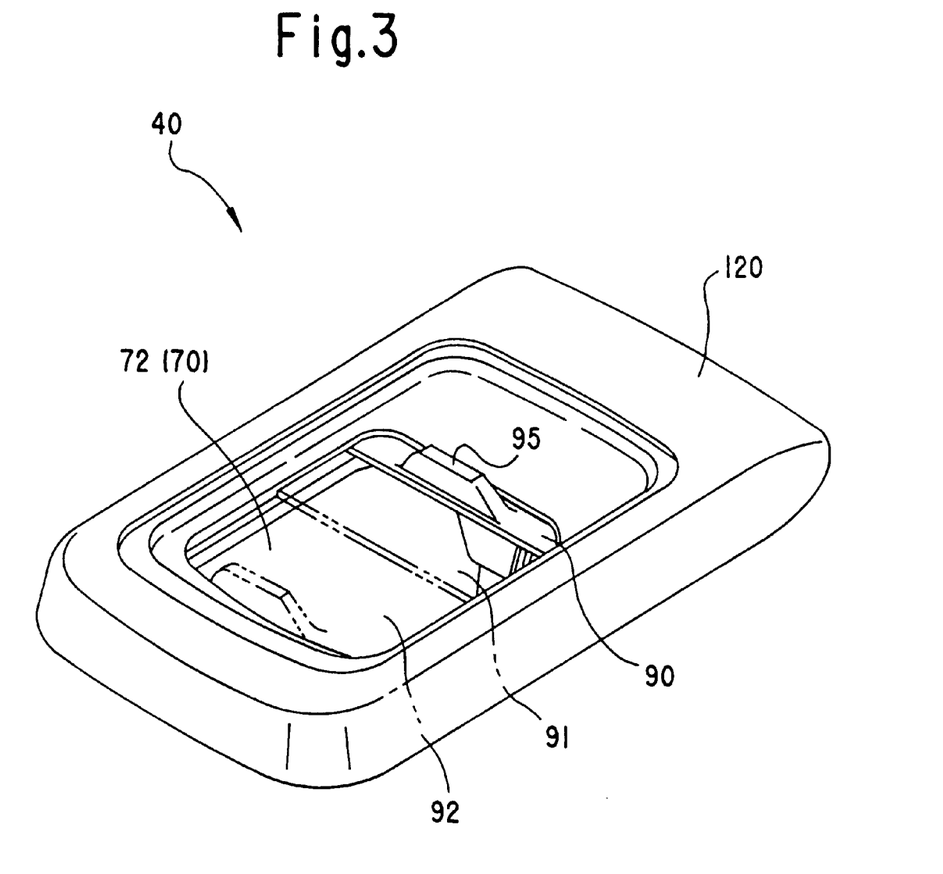
FIG. 3 is a perspective view of the lid.

In the present invention, the lid (40) includes a cup inserting hole (70) and a sliding door (90) as shown in, for example, FIGS. 1 and 3.

The cup inserting hole (70) vertically passes through the lid (40) as shown in, for example, FIGS. 1 and 3.

Figure 4:
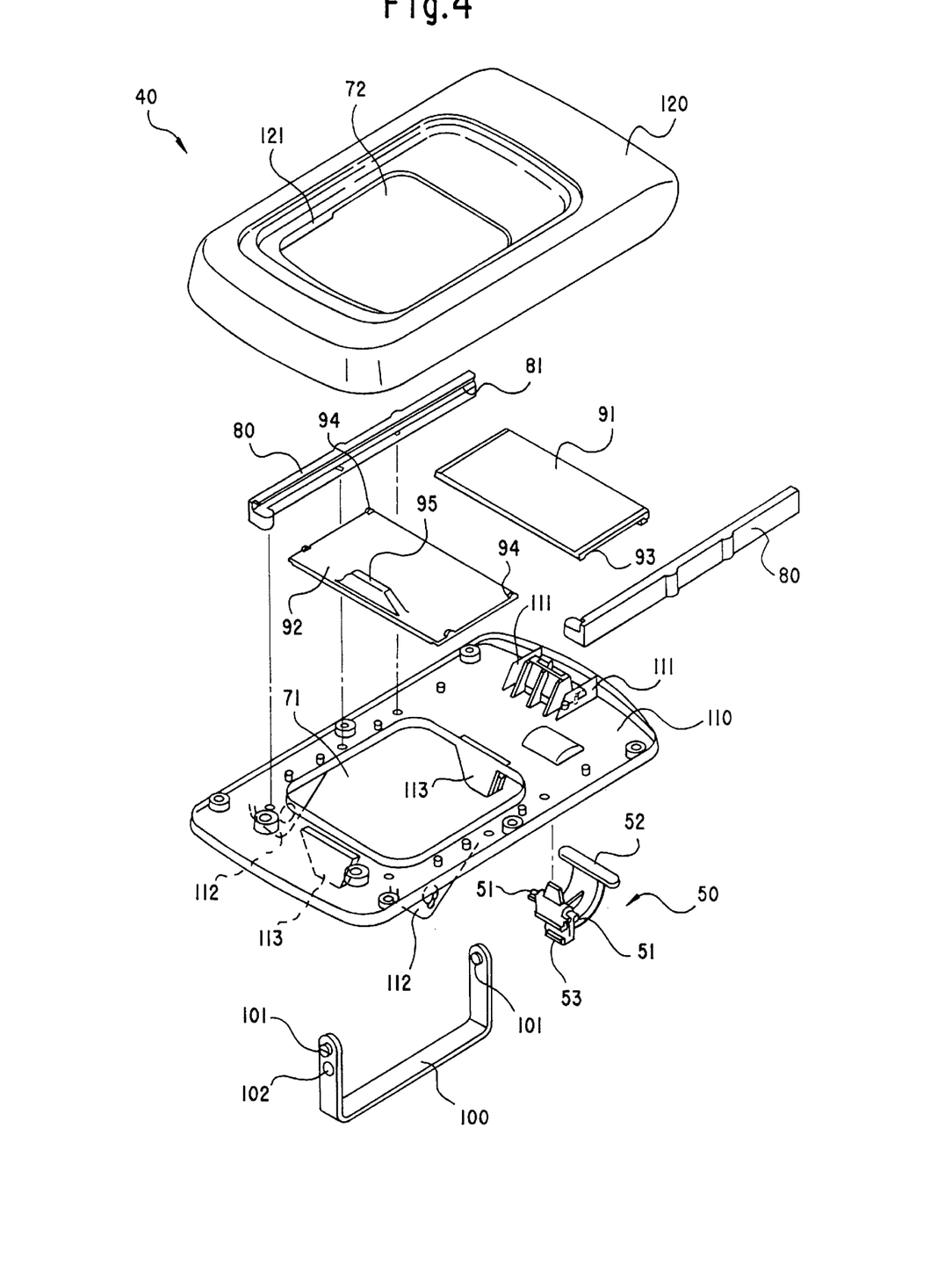
FIG. 4 is an exploded perspective view of the lid.
Figure 5:
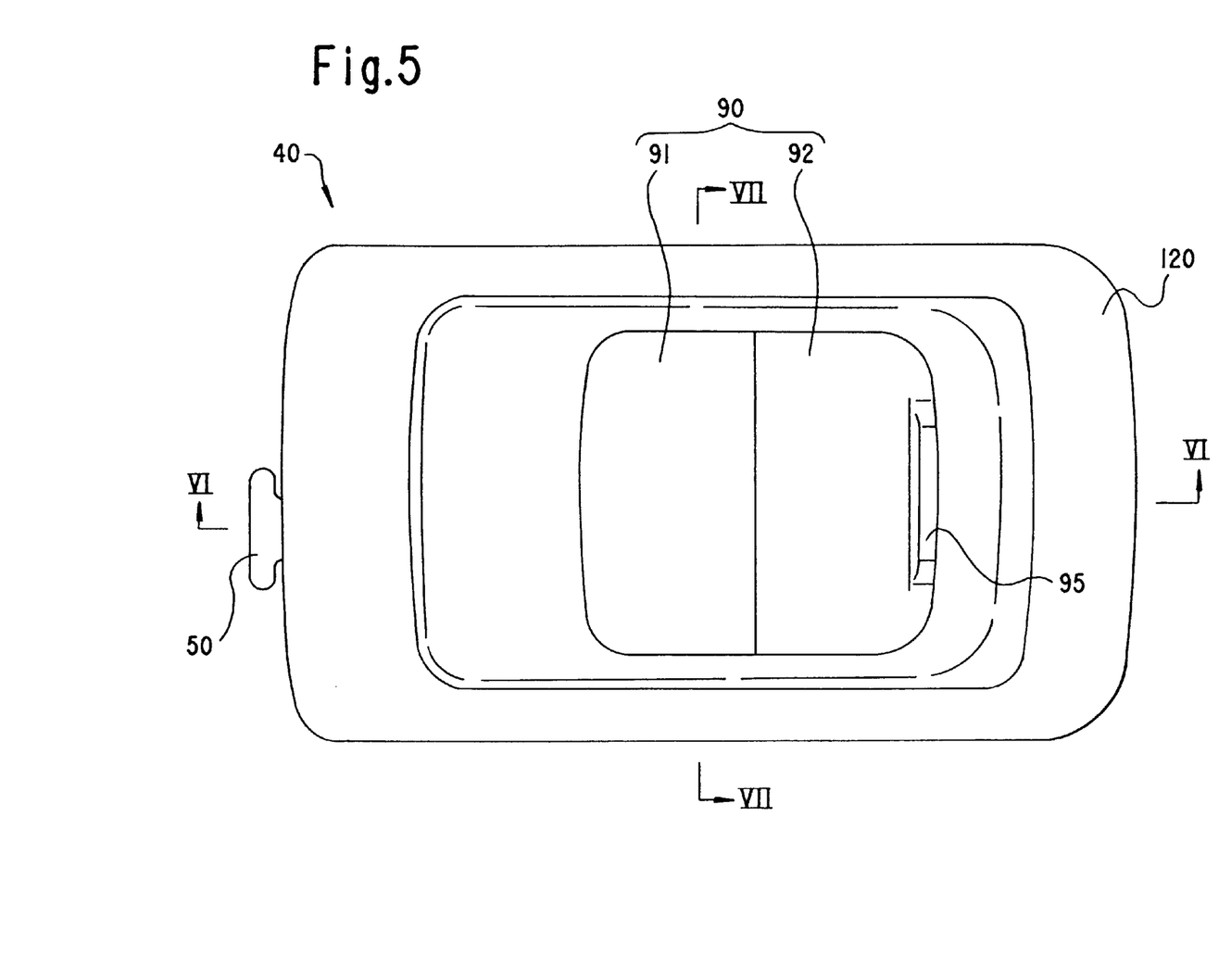
FIG. 5 is a plan view of the lid.

The sliding door (90) is held by slide rails (80) disposed to the lid (40) so as to slide thereon in order to open and close the cup inserting hole (70) as shown in, for example, FIGS. 1, 3 and 4.

Although the slide rails (80) are disposed separately from the lid (40), the present invention is not limited thereto and it may be formed integrally with, for example, the lid base (110) of the lid (40).

The sliding door (90) slides so as to be abutted against the periphery of cups (A to C) inserted into the cup inserting hole (70) and they are held between them and the inner edge of the cup inserting hole (70) by adjusting an amount of opening of the cup inserting hole (70).

In the present invention a cup receiver (100) is disposed on the lower surface of the lid (40) as shown in, for example, FIG. 1 and 4.

Figure 14:
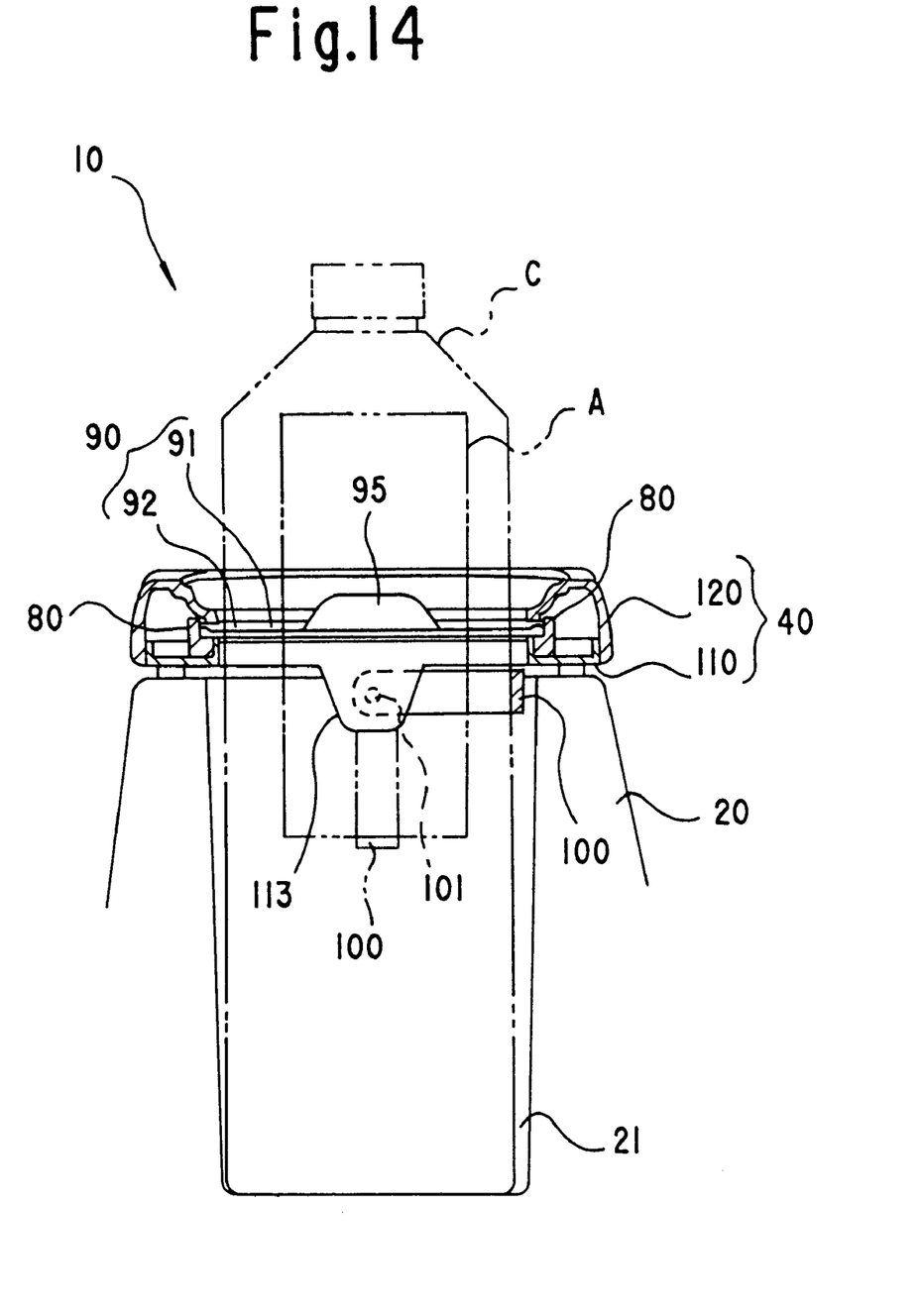
FIG. 14 is a partial plan view of FIG. 13.

The cup receiver (100) is supported on the lower surface of the lid (40) so as to be turned as shown in FIGS. 14.

The cup receiver (100) is turned to a position for use where it is suspended from the lower surface of the lid (40) (for example, refer to FIG. 1) and to a folded position (for example, refer to FIG. 14) where it is turned from the position for use toward the lower surface of the lid (40) and folded in parallel with the lower surface of the lid (40).

Further, the cup receiver (100) is located between the lower surface of the lid (40) and the bottom of the hollow portion (21) of the box main body (20) at the position for use as shown in, for example, FIG. 1 and the bottom of the cups A, B inserted into the cup inserting hole (70) is placed thereon.

Figure 8:
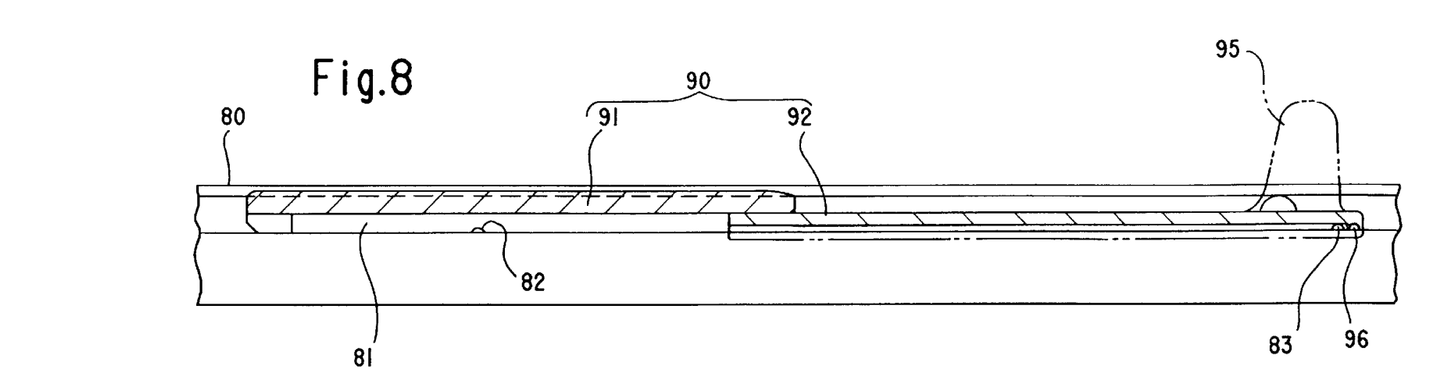
FIG. 8 is an enlarged sectional view showing a slide rail and a sliding door and FIG. 8A is an enlarge view of the right side of FIG. 8.

In the present invention, a projection (82) is formed on the slide rails (80) of the lid (40) and a recess (96) on the sliding door (90) as shown in, for example, FIG. 8. Alternatively, a recess is formed on the slide rails 80 and a projection on the sliding door.

Although not shown, the recess (96) and the projection (82) are engaged with each other while the sliding door (90) slides to thereby cause the operator who slides the sliding door (90) to feel a click feeling.

Although the recess (96) is formed on the sliding door (90) and the projection (82) is formed on the slide rails (80) as shown, for example, in FIG. 8, the projection may be formed on the sliding door (90) and the recess may be formed on the slide rails (80) on the contrary.

In the present invention, a second projection (83) is formed on the slide rails (80) of the lid (40) as shown in, for example, FIG. 8. Alternatively, a second recess is formed on the slide rails (80) when the projection is formed on the sliding door (90).

The second projection (83) (or second recess) on the slide rails is engaged with the recess (96) (or projection) in the sliding door (90) at the position where the cup inserting hole (70) is closed by the sliding door (90) to thereby cause the operator to feel the click feeling.

Although the recess (96) is formed on the sliding door (90) and the projection (83) is formed on the slide rails (80) as shown in, for example, FIG. 8, the projection may be formed on the sliding door (90) and the recess may be formed on the slide rails (80) on the contrary.

In the present invention, the sliding door (90) is composed of a plurality of (for example, two) sliding sheets (91, 92) as shown in, for example, FIGS. 4 and 8.

Note that, the sliding sheets (91, 92) are not limited to the two sheets and it may be three or more sheets or may be composed of a multiplicity of rod-shaped member connected to each other as found in a so-called accordion curtain.

The plurality of sliding sheets (91, 92) are arranged such that the bottom surface of each upper sheet is partially overlapped with the upper surface of each lower sheet.

DETAILED DESCRIPTION OF THE PREFERRED EMBODIMENTS

Automobile-Mounted Console Box

In FIG. 1, numeral 10 denotes a console box and although not shown, the console box 10 is interposed between, for example, a driver's seat and the passenger seat next to the driver's seat and called a so-called center console box.

The position of the console box 10 is not limited to the center and it may be disposed to a rear seat.

Roughly saying, the console box 10 includes a hollow box main body 20 having a hollow portion 21 with its upper surface opened and a lid 40 which is openably and closably attached to the open upper surface of the box main body 20 with a hinge member 30.

The box main body 20 and the lid 40 are formed of plastic and the hinge member 30 is formed of, for example, metal. It is needless to say that the box main body 20 and the lid 40 may be formed of metal and the hinge member 30 may be formed on plastic.

As shown in FIGS. 1 and 2, the lid 40 has a free end provided with a stopper 50 and can be locked at a closed position (refer to FIG.1) with the stopper 50.

As shown in FIG. 2, arms 60 extending toward the box main body 20 are disposed to the lid 40 at a middle in the lengthwise direction thereof to thereby regulate the maximum opening angle of the lid 40.

Lid

As shown in FIGS. 1 and 3, the lid 40 is provided with an approximately-square-shaped and vertically-passing-through cup inserting hole 70 and a sliding door 90 which is slidingly held by slide rails 80 disposed inwardly of the lid 40 and opens and closes the cup inserting hole 70.

Figure 13:
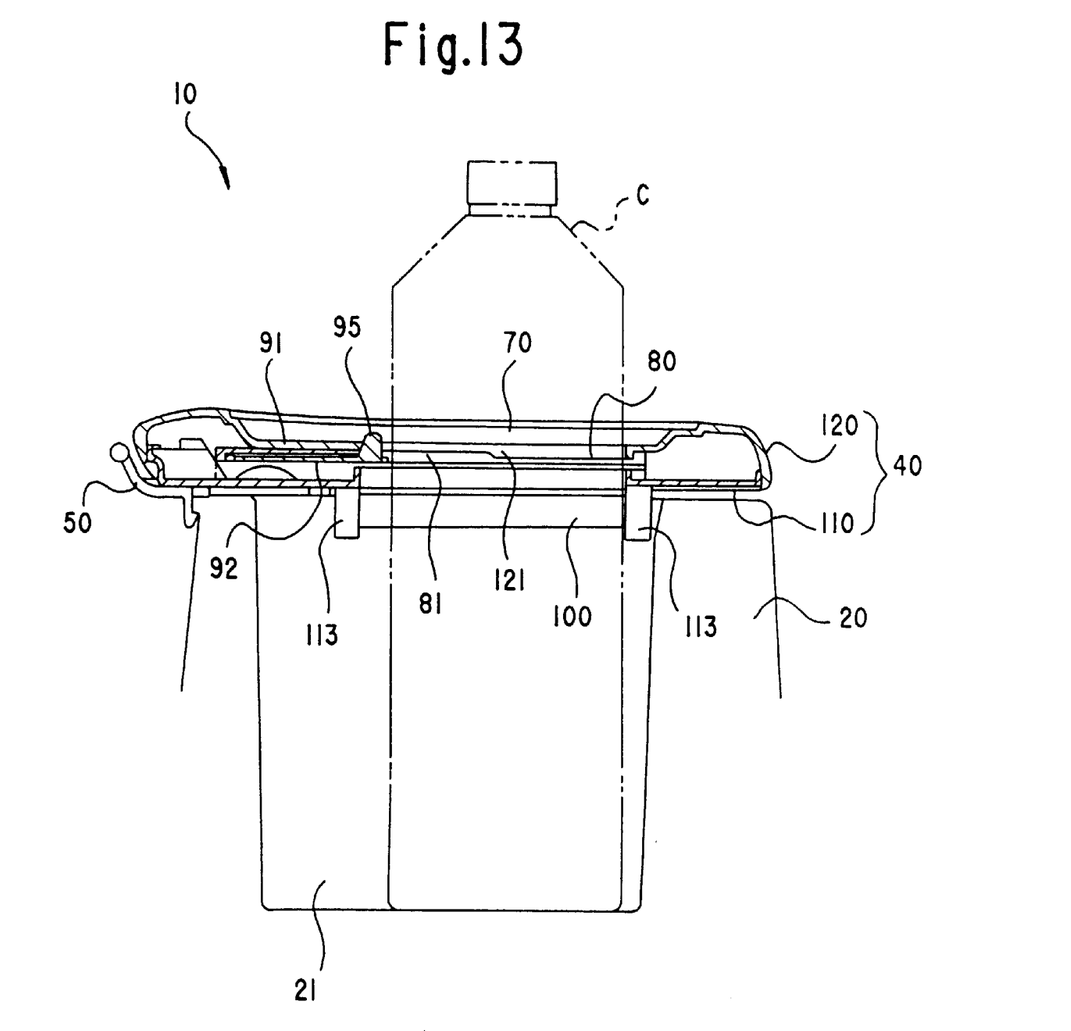
FIG. 13 is a side elevational view showing the position for use of a console box.

As shown in FIG. 13, the inside diameter of the vessel inserting hole 70 is set such that the large diameter vessel C having a relatively large outside diameter such as a PET bottle and the like can be inserted thereinto.

As shown in FIGS. 1 and 13, the open size of the cup inserting hole 70 can be adjusted by changing the sliding amount of the sliding door 90.

The adjustment of the sliding amount of the sliding door 90 permits various sizes of cups covering the small diameter vessel A such as, for example, a paper cup and the like, the medium diameter vessel B such as, for example, a can and the like and the large diameter vessel C such as, for example, the PET bottle exemplified above and the like to be held in the cup inserting hole 70 without wobble.

That is, when the outer periphery of the small diameter vessel A is butted against the sliding door 90 by adjusting the sliding amount thereof, the cup can be clamped between the sliding door 90 and the inner edge of the cup inserting hole 70 confronting the sliding door 90.

Figure 7:
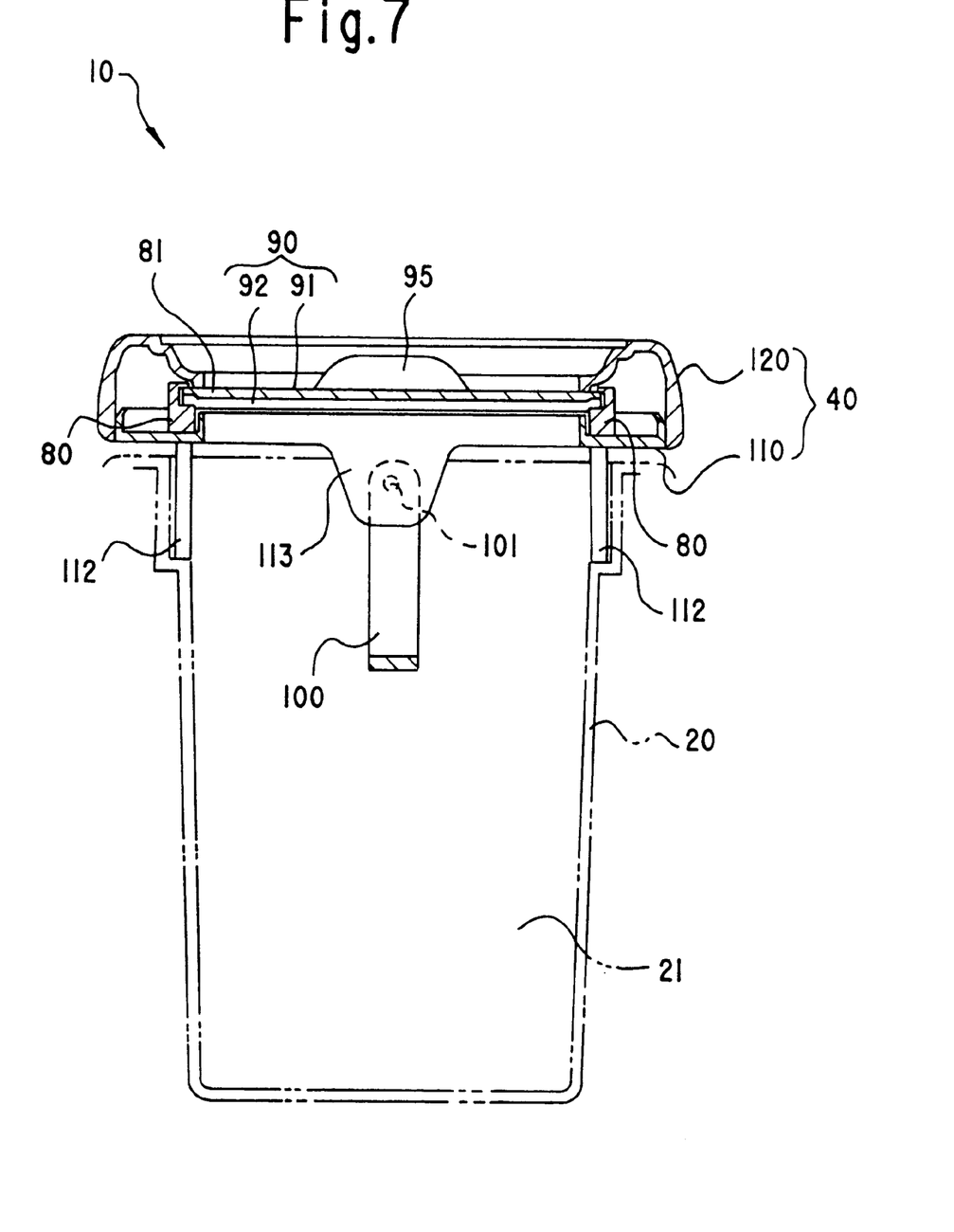
FIG. 7 is a sectional view taken along the line VII—VII of FIG. 5.

On the other hand, a cup receiver 100 is pivotally supported on the lower surface of the lid 40 as shown in FIGS. 7 and 14.

As shown in FIG. 7, the cup receiver 100 is located below the cup inserting hole 70 at the position for use where it is suspended downward so that the lower surface of the small diameter vessel A and the medium size vessel B which are relatively short can be placed on the upper surface of the cup receiver 100.

Whereas, the cup receiver 100 retracts from the cup inserting hole 70 of the lid 40 at the folded position where it is folded so as to be approximately parallel with the lower surface of the lid 40, as shown in FIG. 14. As a result, the large diameter vessel c which is relatively tall can be placed on the bottom of the hollow portion 21 making effective use of the depth of the hollow portion 21 of the console box 10 as shown in FIGS. 13 and 14.

The lid 40 is roughly comprises a lower side lid base 110 and an upper side lid cover 120 as shown in FIG. 4.

Although not shown, the lid base 110 and the lid cover 120 are fixed to each other by screws.

The lid base 110 is integrally formed of a thermoplastic resin having a proper elasticity and rigidity. Likewise, the lid cover 120 is also integrally formed of a thermoplastic resin having a proper elasticity and rigidity.

Lid Base

As shown in FIG. 4, the lid base 110 is formed to a sheet shape and has a square lid side inserting hole 71 as the cup inserting hole 70 at the center thereof.

Figure 6:
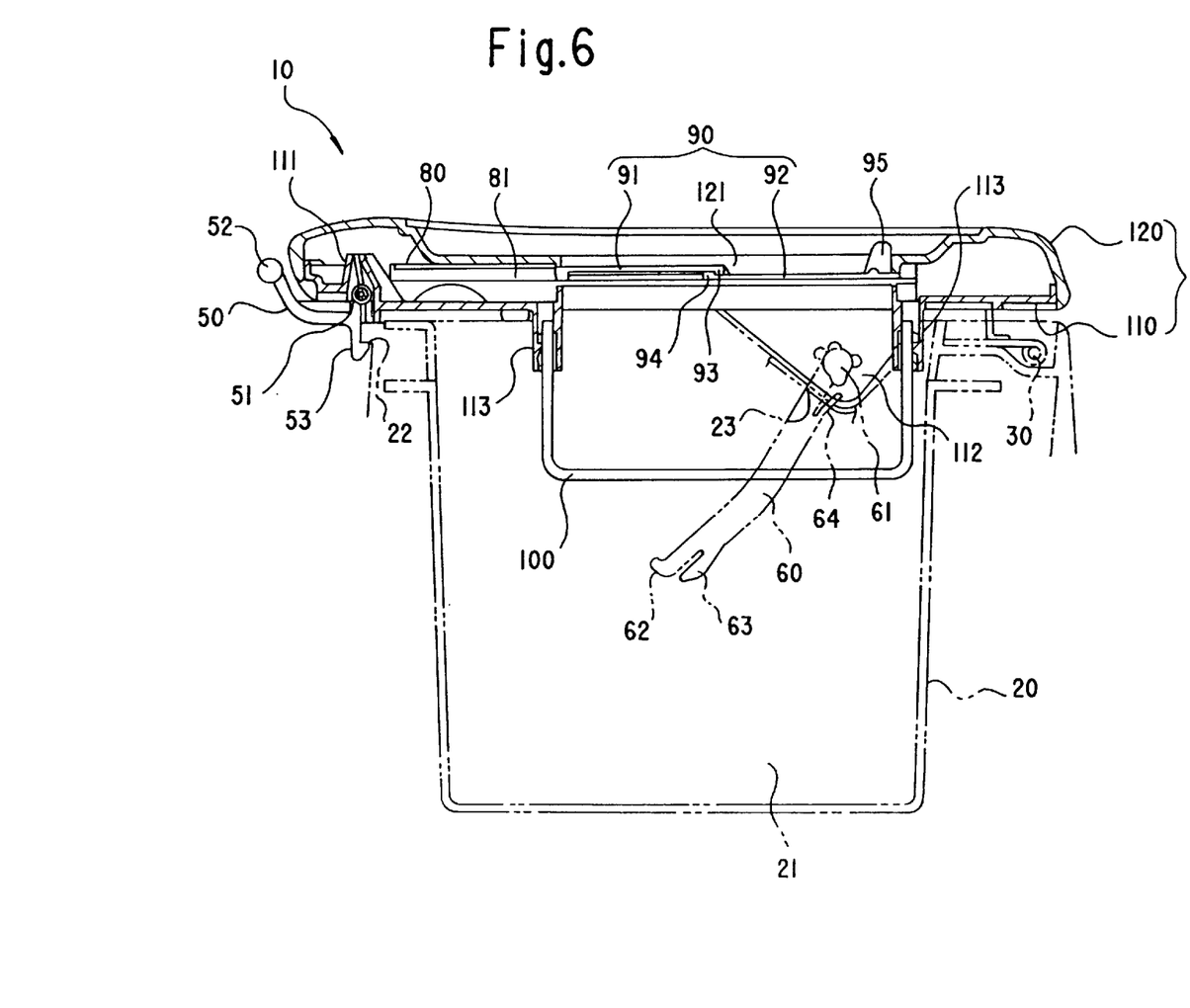
FIG. 6 is a sectional view taken along the line VI—VI of FIG. 5.

As shown in FIGS. 2 and 6, the hinge member 30 is fixed to an end of the lid base 110 so that it can be opened and closed about the hinge member 30.

Further, as shown also in FIGS. 4 and 6, stopper bearing portions 111 are disposed to the other free end of the lid base 110 and the stopper shafts 51 of the stopper 50 are pivotally supported by the stopper bearing portions 111.

As shown in FIGS. 4, 7, a pair of the right and left slide rails 80 are located on the upper surface of the lid base 110 on based on both the right and left side thereof across the lid side inserting hole 71.

Although the right and left slide rails 80 are arranged separately from the lid base 110, they are not limited thereto and may be formed integrally with the lid base 110.

As shown in FIGS. 4 and 7, the right and left slide rails 80 have slide grooves 81 which confront each other and are opened laterally and both the right and left edges of the sliding door 90 are slidingly inserted into the respective slide grooves 81.

As shown in FIGS. 4 and 6, a pair of right and left arm bearing portions 112, 112 are formed on the lower surface of the lid base 110 so as to be located on the right and left sides across the lid side inserting hole 71, respectively and pivotally support the arm shaft 61 of the arms 60.

As shown also in FIGS. 4 and 6, a pair of front and rear cap receiving bearing portions 113, 113 are disposed on the lower surface of the lid base 110 so as to locate forward and rearward across the lid side inserting hole 71, respectively and the respective projecting shafts 101 at both the ends of the cup receiver 100 are pivotally supported by the front and rear cap receiving bearing portions 113.

Lid Cover

As shown in FIGS. 4 and 6, the lid cover 120 has a hollow structure with its lower surface opened, the lid base 110 is completely inserted thereinto from the open lower surface and both of them are fixed to each other by screws.

As shown in FIGS. 3 and 4, a square cover side inserting hole 72 is formed to the lid cover 120 approximately at the center thereof and constitutes the cup inserting hole 70 by being vertically aligned with the lid side inserting hole 71 of the lid base 110.

Sliding Door

As shown in FIGS. 4 and 8, the sliding door 90 is composed of a plurality of sliding sheets, and in the embodiment, two upper and lower sliding sheets 91, 92 which are partially overlapped with each other in a vertical direction.

As shown in FIGS. 7 and 8, the right and left edges of the two upper and lower sliding sheets 91, 92 are inserted into the respective slide grooves 81 of the right and left sliding rails 80.

As shown in FIGS. 4 and 6, a communicating step portion 93 making use of its thickness is formed on the lower surface of the upper sliding sheet 91 and a communicating projection 94, which is hooked to the communicating step portion 93, is formed on the upper surface of the lower slide sheet 92.

As a result, the communicating step portion 93 is hooked to the communicating projection 94 to thereby permit the two upper and lower sliding sheets 91, 92 to slide in a coupled state as shown in FIG. 6.

As shown in FIGS. 4 and 6, a pair of right and left projecting edges 121, 121 which project downward toward the upper sliding sheets 91 are disposed to the cover side inserting hole 72 of the lid cover 120 on the right and left edges thereof and abutted against the upper sliding sheet 91 to thereby regulates the maximum open position of the upper sliding sheet 91.

As shown in FIGS. 3 and 4, a knob 95 projects from the upper surface of the lower sliding sheet 92 and the lower sliding sheet 91 and the upper sliding sheet 92 coupled therewith can be slid by the operator through the knob 95.

Figure 8A:
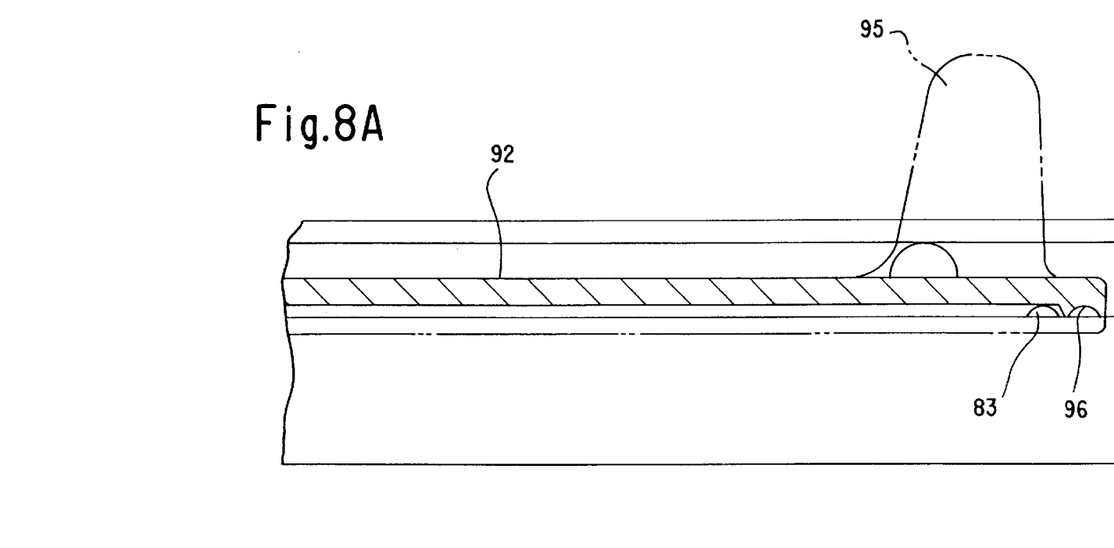

As shown in FIGS. 8 and 8A, the recess 96 is formed at an edge of the lower sliding sheet 92 making use of its thickness.

Whereas, as shown in FIG. 8, the two projections 82, 83, which are engaged with the recess 96, are formed on the bottoms of the respective right and left sliding rails 80.

The first projection 82 on the left side of FIG. 8 of the above two projections 82, 83 is located at a midpoint of in the way of opening and closing of the lower sliding sheet 92. Then, the engagement of the recess 96 of the lower sliding sheet 91 with the first projection 82 gives a click feeling to the operator of the sliding door 90 who operates it through the knob 95. Note that, when the sliding sheet 92 is slid in this state, the recess 96 thereof slides over the projection 82.

The position of the first projection 82 may be located at any position in the way where the lower sliding sheet 92 slides and is not limited to the position shown in FIG. 8.

Further, the second projection 83 on the right side of FIG. 8 of the above two projections 82, 83 is located at a position just before the lower sliding sheet 92 being closed. Then, the engagement of the recess 96 of the lower sliding sheet 92 with the second projection 83 gives the operator the click feeling just before the lower sliding sheet 92 being closed. Note that, when the lower sliding sheet 92 is closed in this state, the recess 96 slides over the second recess 83 so that the cup inserting hole 70 is made to a closed state.

Although the recess 96 is formed to the lower sliding sheet 92 and the two projections 82, 83 are formed to the respective slide grooves 81 of the sliding rails 80, the present invention is not limited thereto and any recess and projection may be employed so long as they are engaged with each other and further the projection may be formed to the lower sliding sheet 92 and the recess may be formed to the respective slide grooves 81. In addition, the number of the projections 82, 83 may be one or at least three.

Cup Receiver

As shown in FIG. 4 and FIGS. 9–12, the cup receiver 100 is formed to an approximate C-shape and the pair of projecting shafts 101 which project in the sheet thickness direction are disposed to the respective two upper ends.

Figure 9:
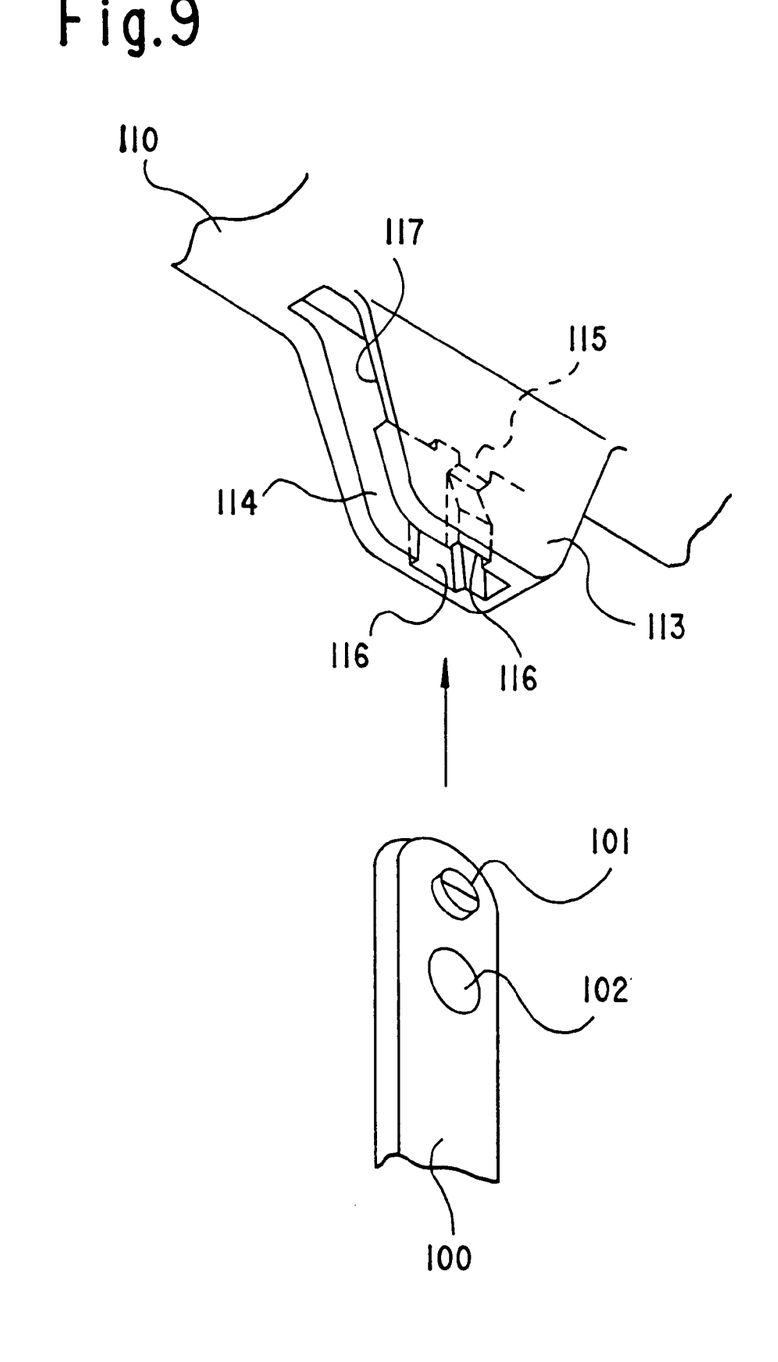
FIG. 9 is an exploded perspective view showing a bearing portion and a cup receiver.
Figure 10:
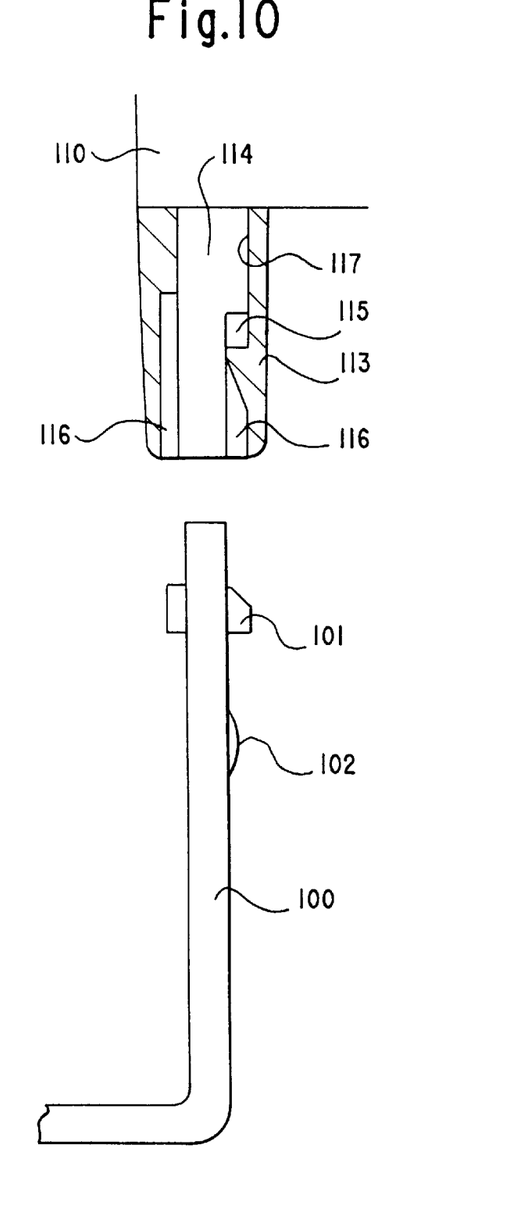
FIG. 10 is an exploded sectional view showing the bearing portion and the cup receiver.

As shown in FIGS. 4, 9 and 10, protruded portions 102 which protrude to a semi-spherical shape are formed to the respective upper ends of the cup receiver 100 on the outside surfaces thereof below the projecting shafts 101.

Figure 12:
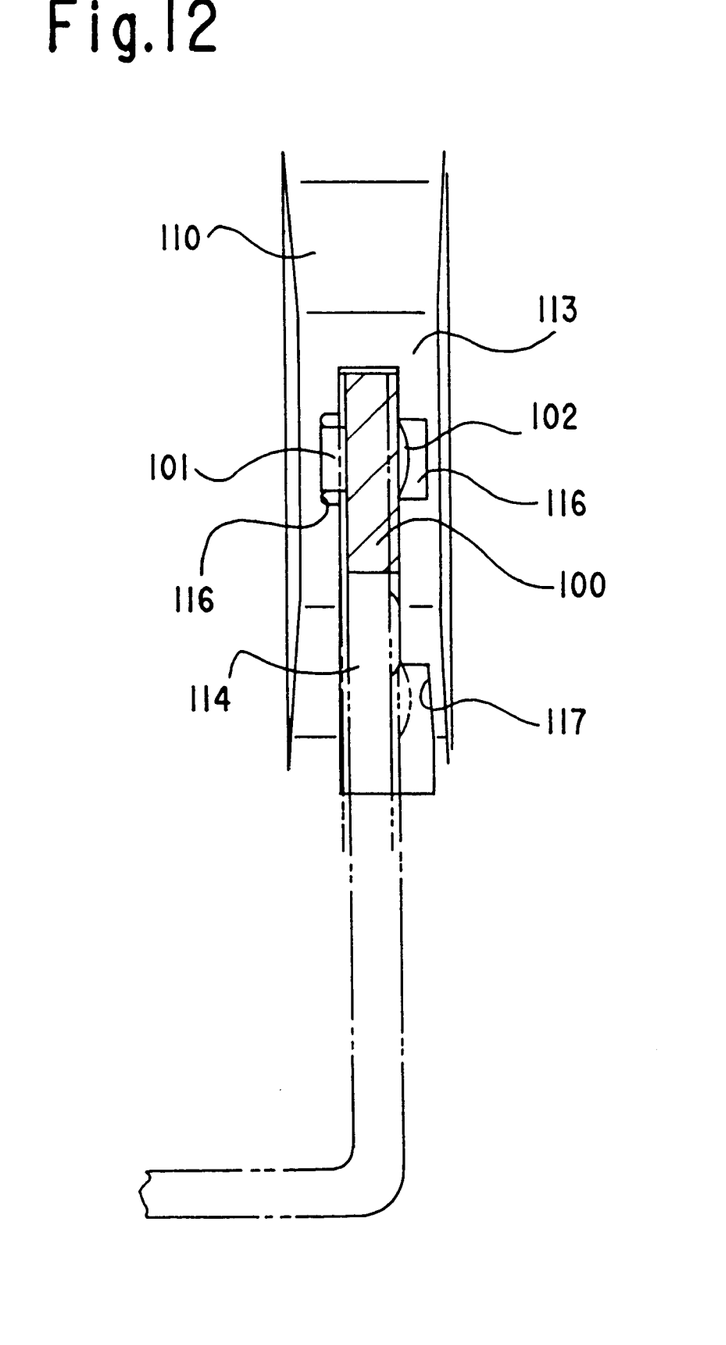
FIG. 12 is a plan view showing the bearing portion and the cup receiver.

Whereas, as shown in FIGS. 9, 10 and 12, slits 114 are formed to the respective front and rear cap receiving bearing portions 113, 113 on the lower surface of the lid base 110, respectively to permit around 90 degrees turn of the cup receiver 100.

As shown in FIGS. 9 and 10, shaft holes 115 into which the respective projecting shafts 101 of the cup receiver 100 are inserted are formed in the respective slits 114.

As shown in FIGS. 9, 10 and 12, guide grooves 116 are formed and used when the respective projecting shafts 101 of the cup receiver 100 are inserted toward the shaft holes 115.

As shown in FIGS. 9 and 10, when the respective projecting shafts 101 are aligned with and inserted into the guide grooves 116, the slits 114 are pressed in an opening direction by the respective projecting shafts 101 and the tapered surfaces in the guide grooves 116 so that the slits 114 are expanded by the elastic force of the resin.

Figure 11:
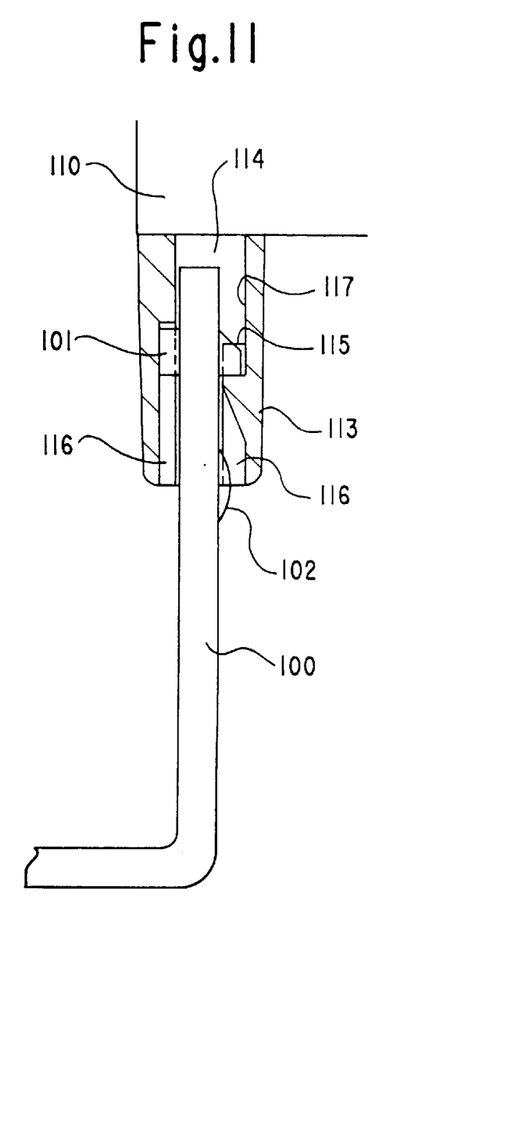
FIG. 11 a sectional view showing the bearing portion and the cup receiver in correspondence to FIG. 10.

When the respective projecting shafts 101 are more deeply inserted, they are completely inserted into the shaft holes 115 and at the time the slits 114 are restored by the elastic restoring force of the resin as shown in FIG. 11. As a result, the respective projecting shafts 101 are inserted into the shaft holes 115 with the click feeling and a moderate feeling and cannot be removed therefrom.

When the cup receiver 100 is turned downward as shown in FIGS. 6, 7 and 11, it projects below the cup inserting hole 70 of the lid 40 and is located at the position for use.

At the above position for use, the lower surface of the small diameter cup A and the medium diameter cup B which are relatively short can be placed on the upper surface of the cup receiver 100 as shown in FIG. 1 and by the two-dot-and-dash lines in FIG. 14.

At the position for use, the protruded portions 102 of the cup receiver 100 are located in the guide grooves 116 of the lid base 110 as shown in FIGS. 11 and 12, the cup receiver 100 is turned with the moderate feeling and further the wobble of the cup receiver 100 can be prevented.

Whereas, when the cup receiver 100 is turned upward as shown in FIGS. 13 and 14, it is folded approximately in parallel with the lower surface of the lid base 110 and located at the folded position.

At the folded position, the cup receiver 100 does not project below the cup inserting hole 70 of the lid 40 as shown in FIG. 3.

As a result, the large diameter vessel C which is relatively tall can be placed on the bottom of the hollow portion 21 making effective use of the depth of the hollow portion 21 of the console box 10.

In addition, at the folded position, the protruded portions 102 of the cup receiver 100 are located in cavities 117 formed in the slits 114 of the lid base 110 as shown by the two-dot-and-dash line in FIG. 12, the cup receiver 100 is turned toward the folded position with the moderate feeling and further the wobble of the cup receiver 100 can be prevented at the folded position.

Stopper

As shown in FIG. 4, the stopper 50 comprises a bar-shaped operating portion 52 which curves and extends upward about the right and left stopper shafts 51, 51 and a claw portion 53 which extends downward and is integrally formed of, for example, a thermoplastic resin having a proper elasticity and rigidity.

Whereas, as shown in FIGS. 1 and 2, a step-shaped locking portion 22 to which the claw portion 53 of the stopper 50 is hooked is disposed around the hollow portion 21 of the console box 10.

As shown in FIG. 6, the right and left stopper shafts 51 of the stopper 50 are pivotally supported by the stopper bearing portions 111 of the lid base 110.

The claw portion 53 of the stopper 50 is urged in the direction where it is hooked to the locking portion 22 of the console box 10 by the elastic force of the resin of the entire stopper 50.

As a result, when the lid 40 is closed as shown in FIG. 1, the claw portion 53 of the stopper 50 is inserted into the locking portion 22 of the console box 10 with a click sound to thereby lock the lid 40 at a closed position.

Whereas, when the operating portion 52 of the stopper 50 is lifted, the stopper 50 is flexed as a whole and the claw portion 53 is removed from the locking portion 22 so that the locked state is released. As a result, when the lid 40 is turned upward in this state, the lid 40 is opened as shown in FIG. 2.

Arm

The right and left arms 60 are integrally formed of a thermoplastic resin having a proper elasticity and rigidity, the arm shafts 61 at the respective upper ends thereof are pivotally supported by the right and left arm bearing portions 112, 112 of the lid base 110, respectively and the free ends thereof as lower ends project into the arm receiving grooves 23 formed to the hollow portion 21 of the console box 10.

The free ends of the right and left arms 60 projected into the arm receiving grooves 23 are provided with removal preventing portions 62 which are bent to a hook-shape so as to be hooked to the arm receiving grooves 23.

As a result, the maximum opening angle of the lid 40 is regulated by the removal preventing portions 62 of the right and left arms 60 which are hooked to the backsides of the arm receiving grooves 23 of the console box 10 as shown in FIG. 2.

As shown in FIGS. 2 and 6, the right and left arms 60 are provided with elastic pieces 63 formed to a fork shape and the elastic pieces 63 are flexed once by being pressed by the arm receiving grooves 23 of the console box 10 and thereafter expanded with the click sound on the backsides of the arm receiving grooves 23 by the elastic restoring force of the resin to thereby prevent the close of the lid 40 by the dead load, vibration and the like thereof. Note that, the restore of the elastic pieces 63 with the click sound gives the click feeling and the moderate feeling to the operator who opens the lid 40.

As shown in FIGS. 2 and 6, spring pieces 64 extending to a V-fork-shape are also disposed to the right and left arms 60 on the arm bearing portions 112 sides thereof, respectively and the spring pieces 64 are opened and closed with the click sound by being pressed by the arm receiving grooves 23 of the console box 10 to thereby give the click feeling and the moderate feeling to the operator who closes the lid 40.

The respective embodiments in the present invention are described only for an exemplifying object and are not restrictive, the scope of the invention is shown by the appended claims and all the modifications included in the claims are covered by the present invention.

Since the present invention is arranged as described above, it achieves the following advantages.

First, the cup inserting hole can be opened and closed by the sliding door.

Second, a vessel with a different diameter can be held without wobble by the adjustment of the sliding amount of the sliding door.

Further, the present invention achieves the following advantage.

That is, since the folding type cup receiver is provided, a vessel having a different height can be held.

Furthermore, the present invention achieves the following advantage.

That is, since the sliding door stops with the click feeling at a position in its sliding way, the sliding door can be easily positioned.

Since the sliding door is stopped with the click feeling at a position where it is closed, the sliding door can be easily held at the closed position.

In addition, according to the present invention, since the sliding door comprises the plurality of sliding sheets, a space for accommodating the sliding door can be reduced.

What is claimed is:

1. A vessel holder for an automobile-mounted console box, comprising:

a hollow box main body with its upper surface opened;

a lid openably and closably attached to the open upper surface of said box main body;

a vessel inserting hole vertically passing through said lid;

a sliding door which is slidingly held by slide rails disposed to said lid, opens and closes said vessel inserting hole, slides so as to be butted against the periphery of a vessel inserted into said vessel inserting hole and holds the vessel between said sliding door and the inner edge of the vessel inserting hole by adjusting the open amount of said vessel inserting hole; and a vessel receiver disposed on the lower surface of said lid, said vessel receiver being arranged such that it is supported on the lower surface of said lid so as to be turned to a position for use below the lower surface of said lid and toward the lower surface of said lid from the position for use so that it is located at a folded position where it is folded in parallel with the lower surface of said lid as well as at the position for use it is located between the lower surface of said lid and the bottom of said box main body so that the bottom of a cup inserted into said vessel inserting hole is placed thereon.

2. A vessel holder for an automobile-mounted console box according to claim 1, wherein one of a recess and a projection is formed on said slide rails of said lid and the other on said sliding door, said recess and said projection are engaged with each other while said sliding door locates on the way of opening and closing and give a click feeling to the operator who slides said sliding door.

3. A vessel holder for an automobile-mounted console box according to claim 2, wherein another projection is formed on said slide rails of said lid, said another projection on said slide rails is engaged with said recess on said sliding door just before said sliding door closes and gives a click feeling to the operator who slides said sliding door.

4. A vessel holder for an automobile-mounted console box according to claim 3, wherein said sliding door comprises a plurality of sliding sheets which are partially overlapped with each other in a vertical direction.

5. A vessel holder for an automobile-mounted console box according to claim 2, wherein said slide rails have either plural recesses or plural projections.

6. A vessel holder for an automobile-mounted console box according to claim 2, wherein said sliding door comprises a plurality of sliding sheets which are partially overlapped with each other in a vertical direction.

7. A vessel holder for an automobile-mounted console box according to claim 1, wherein one of a recess and a projection is formed on said slide rails of said lid and the other on said sliding door, said recess and said projection are engaged with each other just before said sliding door closes and give a click feeling to the operator who slides said sliding door.

8. A vessel holder for an automobile-mounted console box according to claim 7, wherein said sliding door comprises a plurality of sliding sheets which are partially overlapped with each other in a vertical direction.

9. A vessel holder for an automobile-mounted console box according to claim 1, wherein said sliding door comprises a plurality of sliding sheets which are partially overlapped with each other in a vertical direction.

* * * * *